(12) United States Patent
Satake et al.

(10) Patent No.: US 9,139,163 B2
(45) Date of Patent: Sep. 22, 2015

(54) ELECTRIC-POWERED VEHICLE

(71) Applicant: MITSUBISHI ELECTRIC CORPORATION, Chiyoda-ku, Tokyo (JP)

(72) Inventors: Toshihide Satake, Chiyoda-ku (JP); Kenta Nakamura, Chiyoda-ku (JP); Takanori Matsunaga, Chiyoda-ku (JP); Yoichi Okubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 74 days.

(21) Appl. No.: 14/160,693

(22) Filed: Jan. 22, 2014

(65) Prior Publication Data

US 2014/0247121 A1    Sep. 4, 2014

(30) Foreign Application Priority Data

Mar. 4, 2013 (JP) .................................. 2013-041392

(51) Int. Cl.
*B60Q 1/00* (2006.01)
*B60R 25/40* (2013.01)
*B60R 25/00* (2013.01)

(52) U.S. Cl.
CPC .................. *B60R 25/40* (2013.01); *B60R 25/00* (2013.01)

(58) Field of Classification Search
CPC ............................. B60L 11/1848; G06Q 20/40
USPC .............. 340/455, 636.1, 636.16, 636.2, 657, 340/693.1, 10.1, 10.42; 320/128, 162; 705/44
See application file for complete search history.

(56) References Cited

U.S. PATENT DOCUMENTS 8,354,913 B2 * 1/2013 Solomon et al. ................ 340/5.2
8,717,170 B1 * 5/2014 Juhasz ........................... 340/540

FOREIGN PATENT DOCUMENTS

JP    2012-010449 A    1/2012
JP       4967865 B2    7/2012

OTHER PUBLICATIONS

Japanese Office Action (Notification of Reasons(s) for Refusal), Jan. 21, 2014, Application No. 2013-041392.

* cited by examiner

*Primary Examiner* — Toan N Pham
(74) *Attorney, Agent, or Firm* — Sughrue Mion, PLLC; Richard C. Turner

(57) ABSTRACT

An electric-powered vehicle is provided which is capable of charging a battery with stability, and which is capable of limiting the charging of the battery in the event of theft to provide a high degree of effectiveness of preventing theft by using a simple configuration. In the electric-powered vehicle, a vehicle storage section stores therein information, e.g. an ID list, about charging facilities permitted to charge a vehicle-mounted battery. When the electric-powered vehicle is connected to a charging facility, a charging facility ID acquisition section acquires the ID of the charging facility from the charging facility connected thereto. When it is judged that the ID of the charging facility acquired by the charging facility ID acquisition section is included in the ID list of charging facilities stored in the vehicle storage section, a charging request section makes a request to the charging facility for charging of the vehicle-mounted battery.

5 Claims, 8 Drawing Sheets

F I G. 6
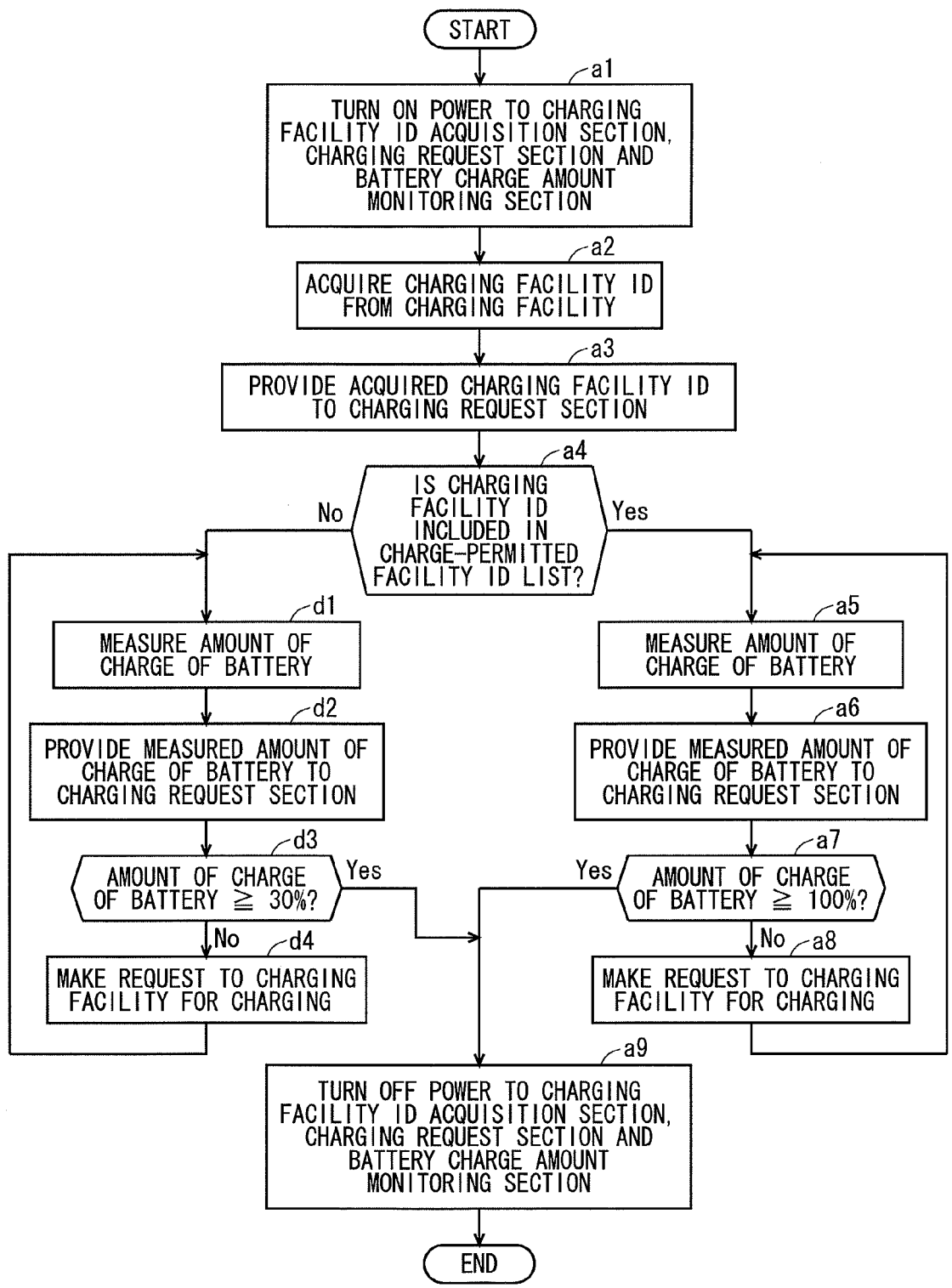

ELECTRIC-POWERED VEHICLE

BACKGROUND OF THE INVENTION

1. Field of the Invention

The present invention relates to an electric-powered vehicle which travels using electric power stored in a battery as a power source.

2. Description of the Background Art

Widespread examples of an electric-powered vehicle which travels using electric power stored in a battery as a power source include an electric vehicle which travels using a motor as a driving source, and a hybrid vehicle which travels using both a motor and an engine as driving sources. Like motor vehicles each of which travels using only an engine as a driving source, electric-powered vehicles (hereinafter referred to simply as "vehicles" in some cases) can be considered to be stolen. It is hence desirable to prevent the vehicles from theft.

A person who steals vehicles (hereinafter referred to as a "thief" in some cases) aims at making free use of the vehicles as one's own after stealing the vehicles or at illegally selling the vehicles themselves or parts of the vehicles. In either case, the vehicle thief first drives a vehicle which he or she has stolen (hereinafter referred to as a "stolen vehicle" in some cases) to flee to a place relatively remote from the place where he or she has stolen the vehicle (hereinafter referred to as a "theft scene" in some cases) for the purpose of avoiding getting caught by the legitimate owner of the vehicle or the police.

A conceivable effective measure to prevent the theft of electric-powered vehicles is to limit the charging of a battery in the stolen vehicle. This decreases the value of the stolen vehicle and prevents the thief from fleeing to a place remote from the theft scene, to discourage the thief from stealing. A technique related to the prevention of the theft of electric-powered vehicles is disclosed, for example, in Japanese Patent No. 4967865.

A vehicle theft prevention apparatus disclosed in Japanese Patent No. 4967865 includes a battery unit, a charging device, an authentication device, and a monitoring device. The battery unit includes a user information storage section for storing therein a user ID, for example, as user information about the user of a vehicle. The charging device includes a charging location information storage section for storing therein charging location information about charging locations in which the charging device is provided. The authentication device includes an authentication section for storing therein a database about a plurality of user IDs and the charging location information.

When a vehicle is connected to the charging device, the charging device receives the user ID from the battery unit mounted on the vehicle to send the received user ID with the charging location information through a network to the authentication device. The authentication device references the database to perform authentication between the user ID and the charging location information which are received from the charging device.

When the user ID and the charging location information are in a predetermined relationship, the authentication device judges that the authentication has been performed to send a charge enable signal to the charging device. When the user ID and the charging location information are not in the predetermined relationship, the authentication device judges that the authentication has not been performed to send a charge disable signal to the charging device. The charging device does not perform charging unless the charging device receives the charge enable signal from the authentication device.

If the vehicle is a stolen vehicle, the authentication is not performed because the user ID for the vehicle and the charging location information in the charging device are not in the predetermined relationship. Thus, the charge disable signal is provided to the charging device but the charge enable signal is not provided thereto, so that the charging is not performed. The vehicle theft prevention apparatus disclosed in Japanese Patent No. 4967865 is capable of preventing the charging of the battery in a vehicle in the aforementioned manner in the case where the vehicle is stolen.

The aforementioned vehicle theft prevention apparatus disclosed in Japanese Patent No. 4967865 has the problem of requiring enormous costs for the construction of facilities including the authentication device and the like. The aforementioned vehicle theft prevention apparatus has further problems to be described below. If the connection between the charging device and the authentication device through the network is broken due to a failure in the authentication device and the like, the charge enable signal is not provided from the authentication device to the charging device, so that the charging is not performed, even when the vehicle is not a stolen vehicle. Also, a charging facility which is not connected to the authentication device, e.g. a charging facility for home use, is able to freely charge the battery in a stolen vehicle, thereby failing to discourage the thief from stealing in the aforementioned manner. This results in a low degree of effectiveness of preventing the theft.

SUMMARY OF THE INVENTION

It is therefore an object of the present invention to provide an electric-powered vehicle which is capable of charging a battery with stability, and which is capable of limiting the charging of the battery in the event of theft to provide a high degree of effectiveness of preventing theft by using a simple configuration.

The present invention is intended for an electric-powered vehicle traveling using electric power stored in a battery as a power source. The electric-powered vehicle includes a battery, a charging request section, a storage section and a charging facility information acquisition section.

The battery is rechargeable by charging facilities provided outside the electric-powered vehicle. The charging request section makes a request to the charging facilities for charging of the battery. The storage section stores therein charge-permitted facility information about some of the charging facilities which are permitted to charge the battery. The charging facility information acquisition section acquires charging facility information about the charging facilities from the one charging facility when connected to the one charging facility.

The charging request section makes the request to the one charging facility for charging of the battery, when the charging request section judges that the charging facility information acquired by the charging facility information acquisition section is included in the charge-permitted facility information stored in the storage section.

The present invention achieves the electric-powered vehicle which is capable of charging the battery with stability, and which is capable of limiting the charging of the battery in the event of theft to provide a high degree of effectiveness of preventing theft by using a simple configuration.

These and other objects, features, aspects and advantages of the present invention will become more apparent from the

BRIEF DESCRIPTION OF THE DRAWINGS

FIGS. 5 to 7 are flow diagrams showing other procedures for the battery charging process of the electric-powered vehicle shown in FIG. 1 according to the first preferred embodiment of the present invention.

DESCRIPTION OF THE PREFERRED EMBODIMENTS

First Preferred Embodiment

Figure 1:
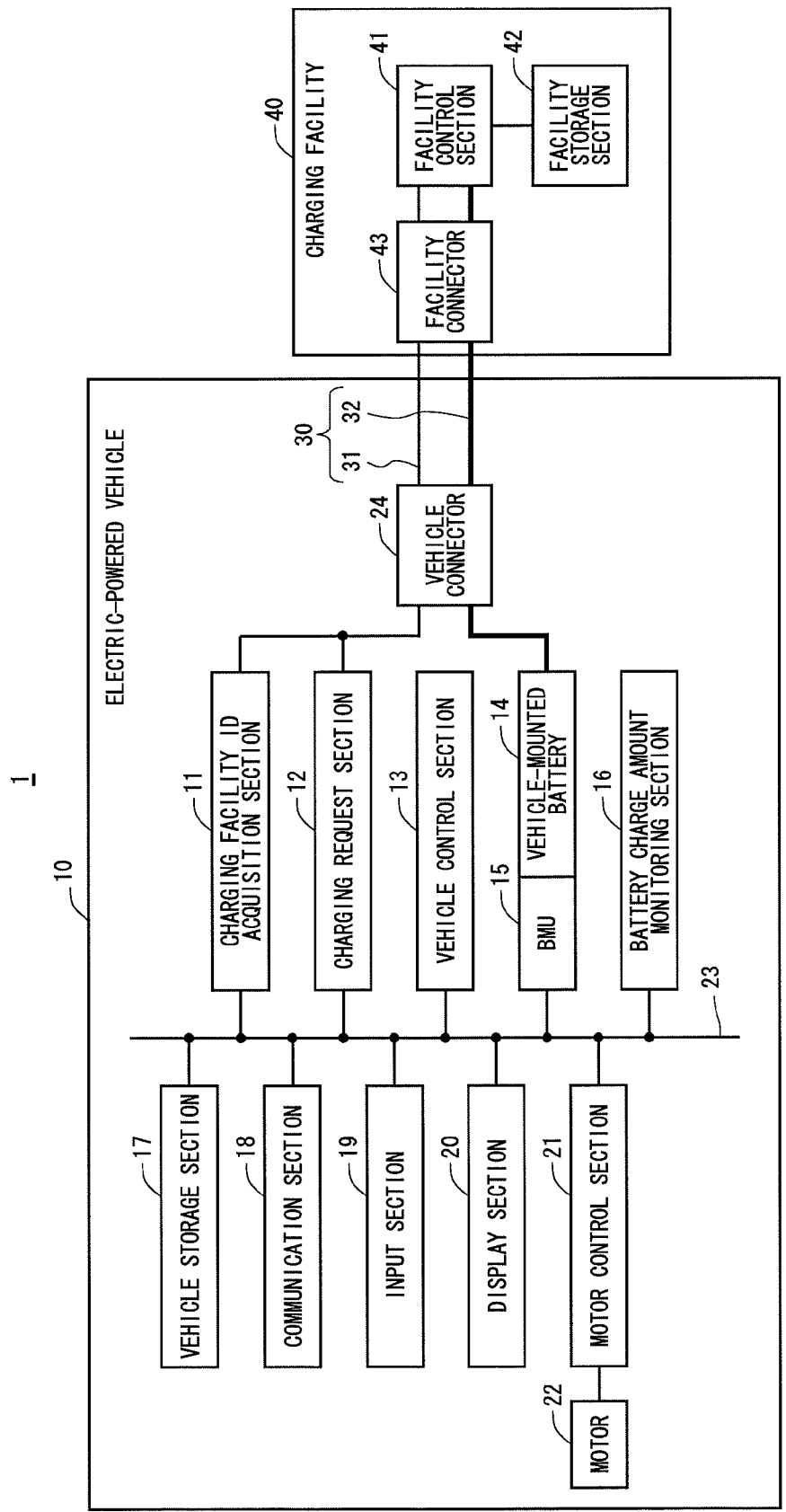
FIG. 1 is a block diagram showing the configuration of a charging system including an electric-powered vehicle according to a first preferred embodiment of the present invention.

FIG. 1 is a block diagram showing the configuration of a charging system 1 including an electric-powered vehicle 10 according to a first preferred embodiment of the present invention. The charging system 1 includes the electric-powered vehicle 10, and a charging facility 40. The charging facility 40 is provided outside the electric-powered vehicle 10.

The electric-powered vehicle 10 includes a charging facility ID acquisition section 11, a charging request section 12, a vehicle control section 13, a vehicle-mounted battery 14, a BMU (battery management unit) 15, a battery charge amount monitoring section 16, a vehicle storage section 17, a communication section 18, an input section 19, a display section 20, a motor control section 21, a motor 22, an intra-vehicle network 23, and a vehicle connector 24. The charging facility ID acquisition section 11 corresponds to a charging facility information acquisition section. The vehicle storage section 17 corresponds to a storage section.

Examples of the electric-powered vehicle 10 include an EV (electric vehicle) and a PHEV (plug-in hybrid electric vehicle). When the electric-powered vehicle 10 is an EV, the electric-powered vehicle 10 travels using the motor 22 as a driving source. When the electric-powered vehicle 10 is a PHEV, the electric-powered vehicle 10 travels using both the motor 22 and an engine not shown as driving sources.

When electric-powered vehicle 10 is connected to the charging facility 40, the charging facility ID acquisition section 11 acquires charging facility information which is information about charging facilities from the charging facility 40 through the vehicle connector 24. In the first preferred embodiment, the charging facility ID acquisition section 11 acquires charging facility identification information which is information for identifying the charging facility 40, more specifically a charging facility ID (charging facility identifier), as the charging facility information. The charging facility ID acquisition section 11 provides the acquired charging facility ID through the intra-vehicle network 23 to the charging request section 12. The charging request section 12 requests the charging facility 40 to charge the vehicle-mounted battery 14.

The vehicle control section 13 is implemented by a CPU (central processing unit), for example. The vehicle control section 13 executes a vehicle control program stored in the vehicle storage section 17 to thereby exercise centralized control of the charging facility ID acquisition section 11, the charging request section 12, the BMU 15, the battery charge amount monitoring section 16, the vehicle storage section 17, the communication section 18, the input section 19, the display section 20 and the motor control section 21 which constitute the electric-powered vehicle 10. The vehicle control section 13 exercises control related to the battery charging of the electric-powered vehicle 10, more specifically control related to the charging of the vehicle-mounted battery 14 used for the travel of the electric-powered vehicle 10.

The vehicle-mounted battery 14 is a source of electric power which supplies electric power to the motor 22. The vehicle-mounted battery 14 is rechargeable by the charging facility 40 provided outside the electric-powered vehicle 10. The vehicle-mounted battery 14 is implemented by a lithium-ion secondary battery, for example. The electric-powered vehicle 10 is configured to be able to travel using the electric power stored in the vehicle-mounted battery 14 as a power source. Specifically, the electric-powered vehicle 10 supplies the electric power stored in the vehicle-mounted battery 14 to the motor 22 to drive the motor 22, thereby traveling.

The BMU 15 is connected to the vehicle-mounted battery 14, and manages the state of the vehicle-mounted battery 14. Specifically, the BMU 15 acquires battery information which is information about the vehicle-mounted battery 14 from the vehicle-mounted battery 14 to manage the state of the vehicle-mounted battery 14, based on the acquired battery information. The battery information includes electric power amount information which is information about the amount of electric power with which the vehicle-mounted battery 14 is charged, and temperature information which is information about the temperature of the vehicle-mounted battery 14, for example.

The electric power amount information as used in the first preferred embodiment represents the value of the amount of electric power with which the vehicle-mounted battery 14 is charged. The BMU 15 measures the amount of electric power with which the vehicle-mounted battery 14 is charged to generate the electric power amount information representing the measured value of the amount of electric power. The temperature information represents the value of the temperature of the vehicle-mounted battery 14. The BMU 15 measures the temperature of the vehicle-mounted battery 14 to generate the temperature information representing the measured value of the temperature.

The BMU 15 provides the battery information including the generated electric power amount information and the generated temperature information through the intra-vehicle network 23 to the vehicle control section 13. The BMU 15 also provides the electric power amount information included in the battery information through the intra-vehicle network 23 to the battery charge amount monitoring section 16.

The battery charge amount monitoring section 16 measures and monitor the amount of charge of the vehicle-mounted battery 14. The amount of charge of the vehicle-mounted battery 14 as used in the first preferred embodiment shall be the percentage of the amount of electric power with which the vehicle-mounted battery 14 is charged with respect to the amount of electric power stored in the vehicle-mounted battery 14 which is obtained when the vehicle-mounted battery 14 is in a full charge state (hereinafter referred to as a "full charge amount" in some cases).

The battery charge amount monitoring section 16 uses the electric power amount information provided from the BMU 15 to measure the amount of charge of the vehicle-mounted battery 14, thereby generating charge amount information representing the measured value of the amount of charge. The battery charge amount monitoring section 16 provides the generated charge amount information through the intra-vehicle network 23 to the charging request section 12.

The vehicle storage section 17 is implemented by a hard disk drive or a rewritable and nonvolatile semiconductor memory. The vehicle storage section 17 stores therein the vehicle control program for controlling the electric-powered vehicle 10. The vehicle storage section 17 also stores therein charge-permitted facility information which is information about some of the charging facilities which are permitted to charge the vehicle-mounted battery 14 of the electric-powered vehicle 10 (hereinafter referred to as "charge-permitted facilities" in some cases). The vehicle storage section 17 in the first preferred embodiment stores therein the charging facility IDs of the respective charge-permitted facilities as the charge-permitted facility information. Specifically, the vehicle storage section 17 stores therein a charge-permitted facility ID list including the charging facility IDs of the respective charge-permitted facilities.

The communication section 18 communicates with a portable communication device external to the electric-powered vehicle 10. Examples of the portable communication device include a mobile telephone, a smartphone and a tablet-type device. When communicating with the portable communication device, the communication section 18 is connected wirelessly, e.g. through a wireless LAN (local area network), to the portable communication device for communication therewith. The communication section 18 may be connected wiredly, e.g. through a USB (universal serial bus) cable or a LAN cable, to the portable communication device for communication therewith.

The input section 19 includes, for example, a touch panel, a remote controller, a manipulation button and a voice input device with a voice recognition function which are manipulated by a user of the electric-powered vehicle 10. The input section 19 is used when the user inputs information including numeric information, character information and instruction information for the vehicle control section 13. When the user manipulates the input section 19, the input section 19 generates a manipulation signal representing information corresponding to the manipulation of the user to provide the manipulation signal through the intra-vehicle network 23 to the vehicle control section 13.

The display section 20 includes a liquid crystal display, for example. The display section 20 displays an image represented by a video signal provided from the vehicle control section 13.

The motor control section 21 controls the amount of electric power supplied from the vehicle-mounted battery 14 to the motor 22 to thereby control the operation of the motor 22. The motor 22 is driven by the electric power supplied from the vehicle-mounted battery 14, and serves as a driving source for the travel of the electric-powered vehicle 10.

The intra-vehicle network 23 is a communication network implemented by a CAN (controller area network), for example. To the intra-vehicle network 23 are connected the charging facility ID acquisition section 11, the charging request section 12, the vehicle control section 13, the BMU 15, the battery charge amount monitoring section 16, the vehicle storage section 17, the communication section 18, the input section 19, the display section 20 and the motor control section 21.

The charging facility ID acquisition section 11, the charging request section 12, the vehicle control section 13, the BMU 15, the battery charge amount monitoring section 16, the vehicle storage section 17, the communication section 18, the input section 19, the display section 20 and the motor control section 21 which are connected to the intra-vehicle network 23 provide and receive information through the intra-vehicle network 23.

The charging facility ID acquisition section 11, the charging request section 12, the vehicle control section 13, the BMU 15, the battery charge amount monitoring section 16, the vehicle storage section 17, the communication section 18, the input section 19, the display section 20 and the motor control section 21 need not have the aforementioned configuration but may be configured to provide and receive information through a shared memory, for example.

The vehicle connector 24 is a connector for connecting the electric-powered vehicle 10 to the charging facility 40. The vehicle connector 24 is connected through communication lines illustrated by thin lines to the charging facility ID acquisition section 11 and to the charging request section 12. The vehicle connector 24 is connected through an electric power line illustrated by a thick line to the vehicle-mounted battery 14.

The charging facility 40 is provided at a location where the electric-powered vehicle 10 can stop, e.g. the home of the owner of the electric-powered vehicle 10 and a gas station. The charging facility 40 is connected to a commercial power supply not shown to receive the supply of electric power from the commercial power supply.

The charging facility 40 includes a facility control section 41, a facility storage section 42 and a facility connector 43. The facility control section 41 is implemented by a CPU, for example. The facility control section 41 executes a facility control program stored in the facility storage section 42 to thereby exercise centralized control of the charging facility 40 including the facility storage section 42 and other section not shown.

The facility control section 41 supplies electric power from the commercial power supply to the vehicle-mounted battery 14 of the electric-powered vehicle 10 to charge the vehicle-mounted battery 14. The facility control section 41 controls the amount of electric power supplied from the commercial power supply to the vehicle-mounted battery 14 to thereby control the amount of charge of the vehicle-mounted battery 14.

The facility storage section 42 is implemented by a hard disk drive or a rewritable and nonvolatile semiconductor memory. The facility storage section 42 stores therein the facility control program for controlling the charging facility 40. The facility storage section 42 also stores therein the charging facility information which is the information about the charging facility 40. The facility storage section 42 in the first preferred embodiment stores therein the charging facility identification information which is identification information for identifying the charging facility 40, more specifically the charging facility ID, as the charging facility information.

The facility connector 43 is a connector for connecting the charging facility 40 to the electric-powered vehicle 10. The facility connector 43 is connected through a communication line illustrated by a thin line and through an electric power line illustrated by a thick line to the facility control section 41. Although not shown, the facility control section 41 is connected through an electric power line to a commercial power supply.

The electric-powered vehicle 10 and the charging facility 40 are connected to each other through a charging cable 30. Specifically, the vehicle connector 24 of the electric-powered vehicle 10 and the facility connector 43 of the charging facility 40 are connected to each other through the charging cable 30, whereby the electric-powered vehicle 10 and the charging facility 40 are connected to each other. The facility control section 41 supplies electric power from the commercial power supply through the facility connector 43, the charging cable 30 and the vehicle connector 24 to the vehicle-mounted battery 14.

The charging cable 30 is attached to the charging facility 40, and is connected to the facility connector 43 of the charging facility 40. The charging cable 30 includes a communication line 31 and an electric power line 32. In FIG. 1, the communication line 31 is illustrated by a thin line, and the electric power line 32 is illustrated by a thick line.

The control related to the battery charging of the electric-powered vehicle 10 is exercised by exchanging instructions and information between the charging request section 12 and the facility control section 41. The exchange of instructions and information is carried out through the communication line 31 constituting the charging cable 30. The transfer of electric power related to the battery charging of the electric-powered vehicle 10 is carried out between the charging facility 40 and the vehicle-mounted battery 14 through the electric power line 32 constituting the charging cable 30.

Figure 2:
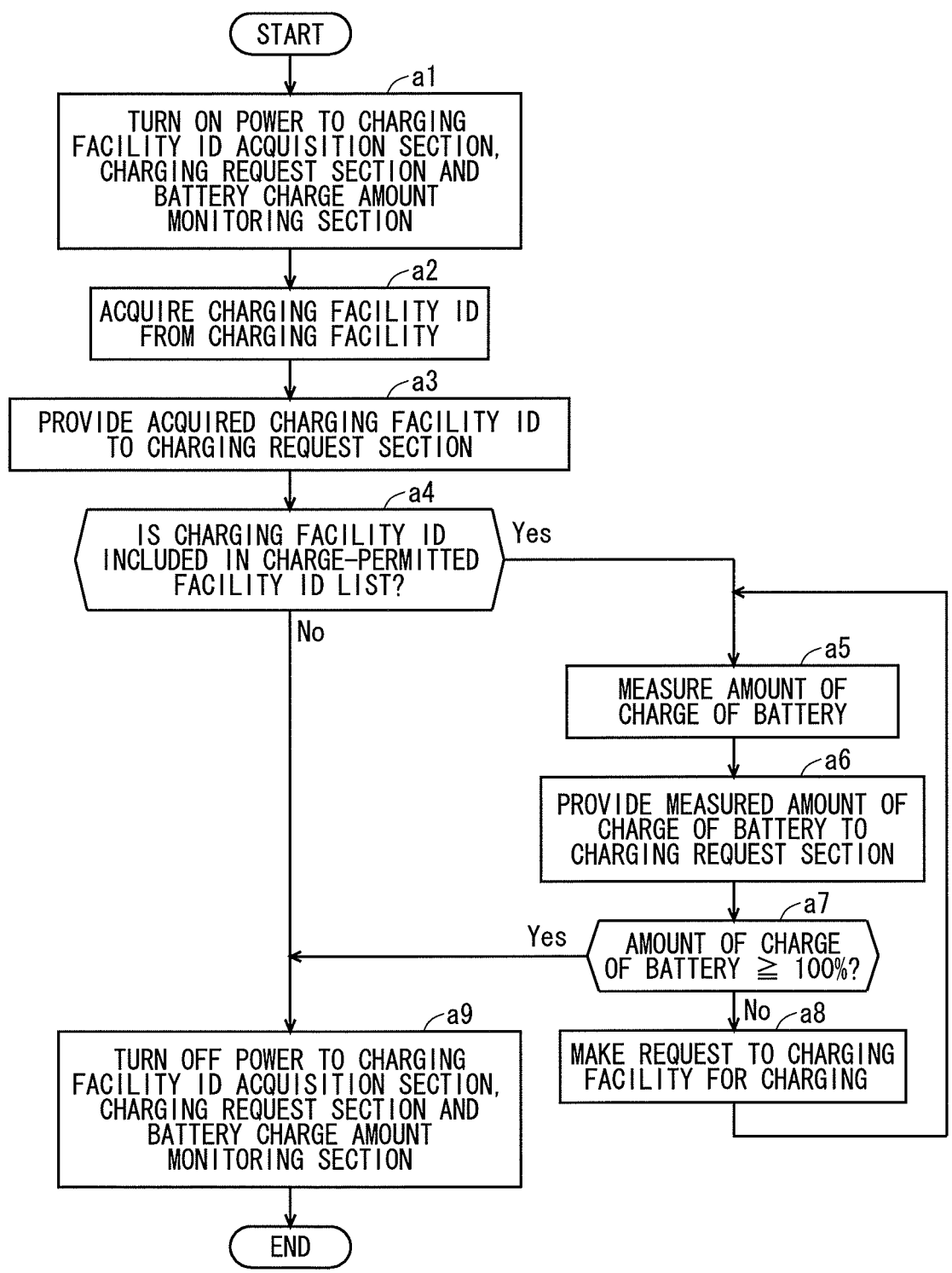
FIG. 2 is a flow diagram showing a procedure for the battery charging process of the electric-powered vehicle shown in FIG. 1 according to the first preferred embodiment of the present invention.

FIG. 2 is a flow diagram showing a procedure for the battery charging process of the electric-powered vehicle 10 according to the first preferred embodiment of the present invention. The process steps in the flow diagram shown in FIG. 2 are executed by the charging facility ID acquisition section 11, the charging request section 12, the vehicle control section 13 and the battery charge amount monitoring section 16 which constitute the electric-powered vehicle 10. Upon being triggered by connecting the charging cable 30 to the electric-powered vehicle 10, the procedure in the flow diagram shown in FIG. 2 starts to proceed to Step a1.

In Step a1, the vehicle control section 13 turns on the power to the charging facility ID acquisition section 11, the charging request section 12 and the battery charge amount monitoring section 16. This supplies electric power to the charging facility ID acquisition section 11, the charging request section 12 and the battery charge amount monitoring section 16. After the vehicle control section 13 turns on the power to the charging facility ID acquisition section 11, the charging request section 12 and the battery charge amount monitoring section 16, the procedure proceeds to Step a2.

In Step a2, the charging facility ID acquisition section 11 acquires the charging facility information, more specifically the charging facility ID, from the charging facility 40 through the vehicle connector 24 and the communication line 31. In Step a3, the charging facility ID acquisition section 11 provides the charging facility ID acquired in Step a2 to the charging request section 12.

In Step a4, the charging request section 12 judges whether the charging facility ID provided from the charging facility ID acquisition section 11 is included in the charge-permitted facility ID list stored in the vehicle storage section 17 or not. When the charging request section 12 judges that the charging facility ID is included in the charge-permitted facility ID list, the procedure proceeds to Step a5. When the charging request section 12 judges that the charging facility ID is not included in the charge-permitted facility ID list, the procedure proceeds to Step a9.

In Step a5, the battery charge amount monitoring section 16 measures the amount of charge of the vehicle-mounted battery 14. In Step a6, the battery charge amount monitoring section 16 provides the amount of charge of the vehicle-mounted battery 14 which is measured in Step a5 through the intra-vehicle network 23 to the charging request section 12.

In Step a7, the charging request section 12 judges whether the amount of charge of the vehicle-mounted battery 14 which is provided from the battery charge amount monitoring section 16 is less than 100% or not. When the charging request section 12 judges that the amount of charge of the vehicle-mounted battery 14 is not less than 100%, the procedure proceeds to Step a9. When the charging request section 12 judges that the amount of charge of the vehicle-mounted battery 14 is less than 100%, the procedure proceeds to Step a8.

In Step a8, the charging request section 12 makes a request to the charging facility 40 for charging. Specifically, the charging request section 12 requests the charging facility 40 to charge the vehicle-mounted battery 14. More specifically, the charging request section 12 sends a charge request signal for making a request that the vehicle-mounted battery 14 be charged to the charging facility 40 through the vehicle connector 24 and the communication line 31.

Upon receipt of the request for charging in Step a8, i.e. upon receipt of the charge request signal, the charging facility 40 outputs previously determined voltage and current through the electric power line 32 and the vehicle connector 24 to the electric-powered vehicle 10, more specifically to the vehicle-mounted battery 14. Thus, the vehicle-mounted battery 14 is charged.

After the request for charging is made in Step a8, the procedure returns to Step a5. Then, the processes in Steps a5 to a8 are repeated. In this manner, the battery charging is performed until the amount of charge of the vehicle-mounted battery 14 reaches 100%.

When it is judged in Step a7 that the amount of charge of the vehicle-mounted battery 14 is not less than 100% or when it is judged in Step a4 that the charging facility ID is not included in the charge-permitted facility ID list, the charging request section 12 does not make the request to the charging facility 40 for charging in Step a8 but the procedure proceeds to Step a9. The charging request section 12 may make a request to the charging facility 40 for the stop of the charging of the vehicle-mounted battery 14, in place of not making the request for charging in Step a8.

In Step a9, the vehicle control section 13 turns off the power to the charging facility ID acquisition section 11, the charging request section 12 and the battery charge amount monitoring section 16. This stops the supply of the electric power to the charging facility ID acquisition section 11, the charging request section 12 and the battery charge amount monitoring section 16. When the vehicle control section 13 turns off the power to the charging facility ID acquisition section 11, the charging request section 12 and the battery charge amount monitoring section 16, the procedure is all completed.

In the first preferred embodiment as described above, when the electric-powered vehicle 10 is connected to the charging facility 40 provided outside the electric-powered vehicle 10, the charging facility ID acquisition section 11 acquires the charging facility ID from the connected charging facility 40. Then, when the charging request section 12 judges that the acquired charging facility ID is included in the charge-permitted facility ID list stored in the vehicle storage section 17, the charging request section 12 makes a request to the charging facility 40 for charging of the vehicle-mounted battery 14.

In other words, the request for charging is made to the charging facility 40 in the first preferred embodiment only when the charging facility ID is included in the charge-permitted facility ID list. When the charging facility ID is not included in the charge-permitted facility ID list, the charging of the vehicle-mounted battery 14 is not performed.

Thus, if a thief steals the electric-powered vehicle 10 of the first preferred embodiment, he or she cannot freely perform the battery charging because the battery charging cannot be performed at other than the previously listed charging facility 40. This discourages the thief from stealing to provide a high degree of effectiveness of preventing theft.

Unlike the background art techniques, the first preferred embodiment eliminates the need to provide facilities including an authentication device, a network and the like outside the electric-powered vehicle 10 for the purpose of judging whether to charge the vehicle-mounted battery 14 or not. Thus, the first preferred embodiment provides the electric-powered vehicle 10 which is capable of limiting the charging of the vehicle-mounted battery 14 in the event of theft as mentioned above to provide a high degree of effectiveness of preventing theft by using a simple configuration at low costs. Also, a break in the connection between the charging device and the authentication device through a network due to a failure in the authentication device and the like does not occur in the first preferred embodiment. This achieves the charging of the vehicle-mounted battery 14 with stability.

As mentioned above, the first preferred embodiment provides the electric-powered vehicle 10 which is capable of charging the vehicle-mounted battery 14 with stability, and which is capable of limiting the charging of the vehicle-mounted battery 14 in the event of theft to provide a high degree of effectiveness of preventing theft by using a simple configuration.

In the first preferred embodiment, the charge-permitted facility ID list including the charging facility IDs of the respective charge-permitted facilities as the charge-permitted facility information is stored in the vehicle storage section 17, and the charging facility ID acquisition section 11 acquires the charging facility ID from the charging facility 40. When the charging request section 12 judges that the acquired charging facility ID is included in the charge-permitted facility ID list stored in the vehicle storage section 17, the charging request section 12 makes a request to the charging facility 40 for charging of the vehicle-mounted battery 14. With such a configuration, the electric-powered vehicle 10 providing the aforementioned high degree of effectiveness is achieved with ease.

Second Preferred Embodiment

Figure 3:
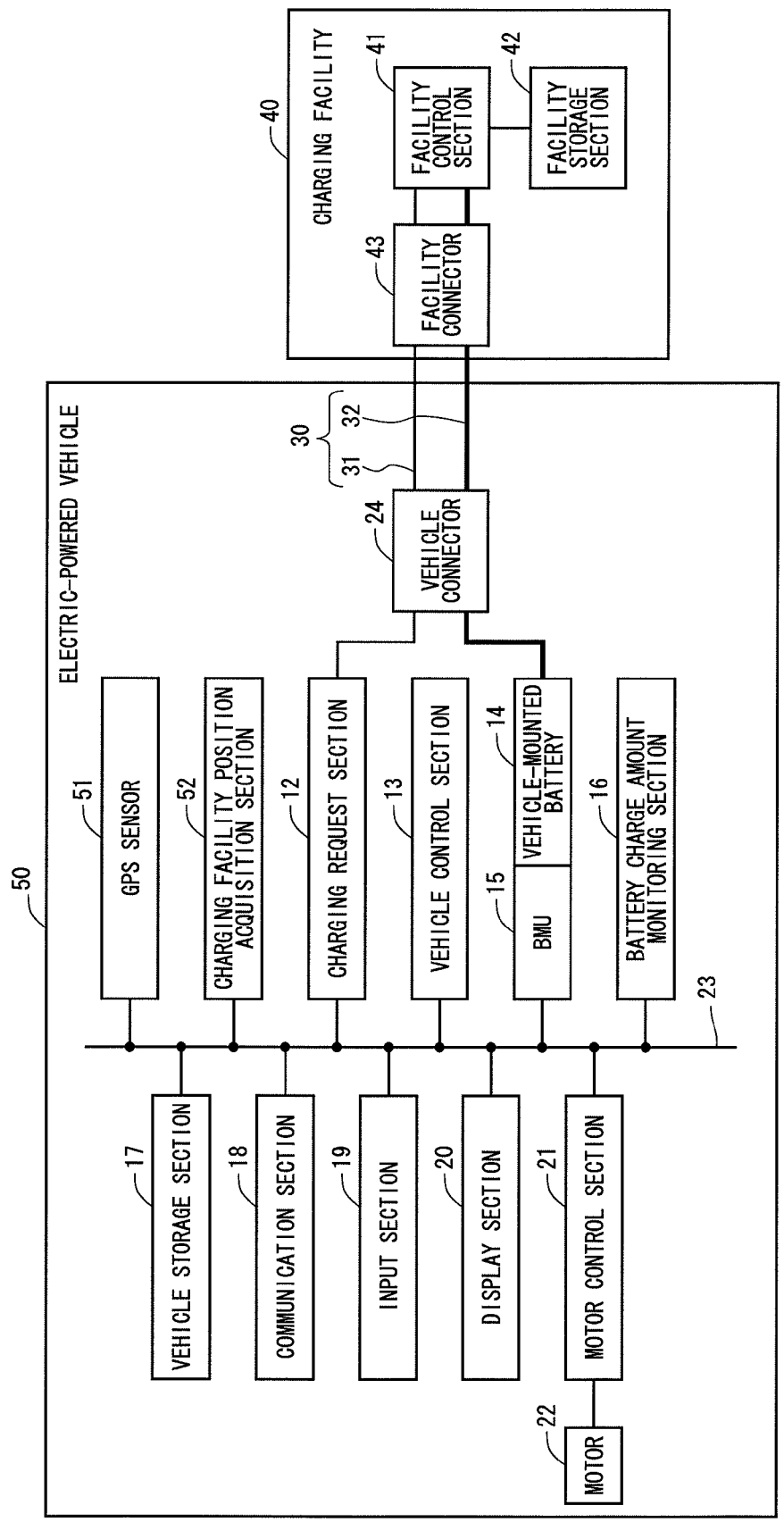
FIG. 3 is a block diagram showing the configuration of another charging system including another electric-powered vehicle according to a second preferred embodiment of the present invention.

FIG. 3 is a block diagram showing the configuration of a charging system 2 including an electric-powered vehicle 50 according to a second preferred embodiment of the present invention. The electric-powered vehicle 50 and the charging system 2 according to the second preferred embodiment are similar in configuration to the electric-powered vehicle 10 and the charging system 1 described above according to the first preferred embodiment. Components identical with those of the first preferred embodiment are designated by the same reference numerals and characters, and will not be described.

The electric-powered vehicle 50 according to the second preferred embodiment includes a GPS (global positioning system) sensor 51 and a charging facility position acquisition section 52 in place of the charging facility ID acquisition section 11 in the electric-powered vehicle 10 of the first preferred embodiment. The charging facility position acquisition section 52 corresponds to the charging facility information acquisition section.

The vehicle storage section 17 in the second preferred embodiment stores therein charging facility position information to be described later about the charge-permitted facilities which are permitted to charge the vehicle-mounted battery 14 in the electric-powered vehicle 50 as the charge-permitted facility information. Specifically, the vehicle storage section 17 stored therein a charge-permitted facility position list including the charging facility position information about the charge-permitted facilities. The charging facility position information about the charge-permitted facilities represents the positions of the respective charge-permitted facilities.

The GPS sensor 51 detects the current position of the electric-powered vehicle 50, based on a radio signal sent from a GPS satellite. The GPS sensor 51 generates current position information representing the detected current position of the electric-powered vehicle 50 to provide the current position information to the charging facility position acquisition section 52.

The charging facility position acquisition section 52 uses the GPS sensor 51 to acquire the charging facility position information which is information representing the position where the charging facility 40 is placed (hereinafter referred to as a "charging facility position" in some cases). The current position of the electric-powered vehicle 50 detected by the GPS sensor 51 is substantially the same as the position of the charging facility 40 to which the electric-powered vehicle 50 is connected. Thus, the charging facility position acquisition section 52 specifically acquires the current position information about the electric-powered vehicle 50 provided from the GPS sensor 51 as the charging facility position information.

To the intra-vehicle network 23 are connected the GPS sensor 51, the charging facility position acquisition section 52, the charging request section 12, the vehicle control section 13, the BMU 15, the battery charge amount monitoring section 16, the vehicle storage section 17, the communication section 18, the input section 19, the display section 20 and the motor control section 21.

The GPS sensor 51, the charging facility position acquisition section 52, the charging request section 12, the vehicle control section 13, the BMU 15, the battery charge amount monitoring section 16, the vehicle storage section 17, the communication section 18, the input section 19, the display section 20 and the motor control section 21 provide and receive information through the intra-vehicle network 23.

The GPS sensor 51, the charging facility position acquisition section 52, the charging request section 12, the vehicle control section 13, the BMU 15, the battery charge amount monitoring section 16, the vehicle storage section 17, the communication section 18, the input section 19, the display section 20 and the motor control section 21 need not have the aforementioned configuration but may be configured to provide and receive information through a shared memory, for example.

In the aforementioned first preferred embodiment, the electric-powered vehicle 10 uses the charging facility ID to judge the charge-permitted facilities. In the second preferred embodiment, the electric-powered vehicle 50 uses the charging facility position information acquired using the GPS sensor 51 to judge the charge-permitted facilities.

Figure 4:
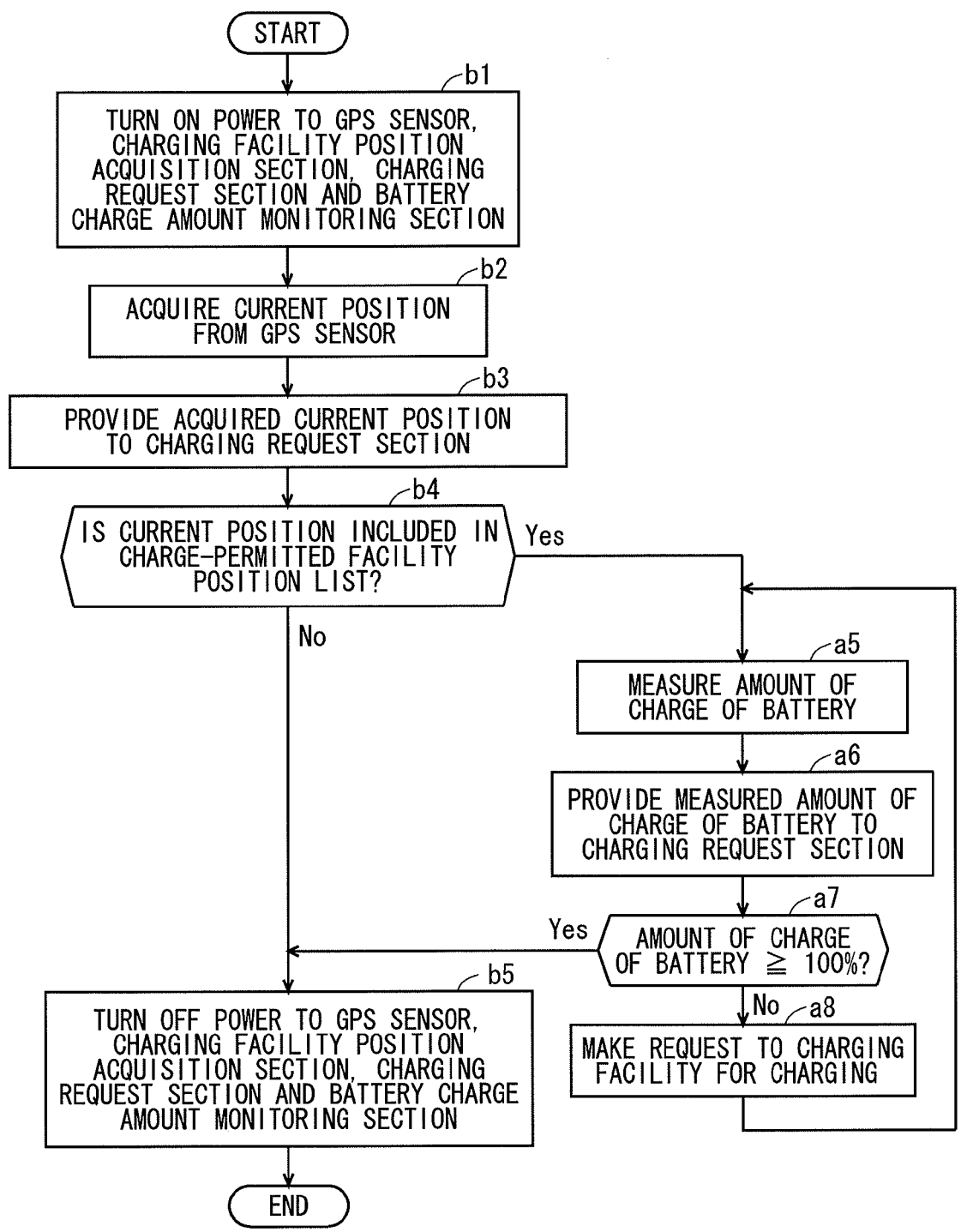
FIG. 4 is a flow diagram showing a procedure for the battery charging process of the electric-powered vehicle shown in FIG. 3 according to the second preferred embodiment of the present invention.

FIG. 4 is a flow diagram showing a procedure for the battery charging process of the electric-powered vehicle 50 according to the second preferred embodiment of the present invention. The process steps in the flow diagram shown in FIG. 4 are executed by the charging facility position acquisition section 52, the charging request section 12, the vehicle control section 13 and the battery charge amount monitoring section 16 which constitute the electric-powered vehicle 50. Process steps identical with those in the flow diagram shown in FIG. 2 described above are designated in FIG. 4 by the same reference characters representing the steps, and will not be described. Upon being triggered by connecting the charging cable 30 to the electric-powered vehicle 50, the procedure in the flow diagram shown in FIG. 4 starts to proceed to Step b1.

In Step b1, the vehicle control section 13 turns on the power to the GPS sensor 51, the charging facility position acquisition section 52, the charging request section 12 and the battery charge amount monitoring section 16. This supplies electric power to the GPS sensor 51, the charging facility position acquisition section 52, the charging request section 12 and the battery charge amount monitoring section 16. After the vehicle control section 13 turns on the power to the GPS sensor 51, the charging facility position acquisition section 52, the charging request section 12 and the battery charge amount monitoring section 16, the procedure proceeds to Step b2.

In Step b2, the charging facility position acquisition section 52 acquires the current position information (hereinafter referred to simply as a "current position" in some cases) representing the current position from the GPS sensor 51 as the charging facility position information. In Step b3, the charging facility position acquisition section 52 provides the current position acquired in Step b2 through the intra-vehicle network 23 to the charging request section 12.

In Step b4, the charging request section 12 judges whether the current position provided from the charging facility position acquisition section 52 is included in the charge-permitted facility position list stored in the vehicle storage section 17 or not. When the charging request section 12 judges that the current position is included in the charge-permitted facility position list, the procedure proceeds to Step a5. When the charging request section 12 judges that the current position is not included in the charge-permitted facility position list, the procedure proceeds to Step b5.

In Step a5, a process similar to that in the first preferred embodiment is performed. Thereafter, processes in Steps a6 and a7 are performed. In the second preferred embodiment, when it is judged in Step a7 that the amount of charge of the vehicle-mounted battery 14 is not less than 100%, the procedure proceeds to Step b5. When it is judged in Step a7 that the amount of charge of the vehicle-mounted battery 14 is less than 100%, the procedure proceeds to Step a8. After a process in Step a8 is performed in a manner similar to that in the first preferred embodiment, the procedure returns to Step a5. Then, the aforementioned processes are repeated.

When it is judged in Step a7 that the amount of charge of the vehicle-mounted battery 14 is not less than 100% or when it is judged in Step b4 that the current position is not included in the charge-permitted facility position list, the charging request section 12 does not make the request to the charging facility 40 for charging in Step a8 but the procedure proceeds to Step b5. A request for the stop of the charging may be explicitly made, in place of not making the request for charging in Step a8.

In Step b5, the vehicle control section 13 turns off the power to the GPS sensor 51, the charging facility position acquisition section 52, the charging request section 12 and the battery charge amount monitoring section 16. This stops the supply of the electric power to the GPS sensor 51, the charging facility position acquisition section 52, the charging request section 12 and the battery charge amount monitoring section 16. When the vehicle control section 13 turns off the power to the GPS sensor 51, the charging facility position acquisition section 52, the charging request section 12 and the battery charge amount monitoring section 16, the procedure is all completed.

In the electric-powered vehicle 50 according to the second preferred embodiment as described above, the request for charging is made to the charging facility 40 only when the current position of the electric-powered vehicle 50 corresponding to the charging facility position is included in the charge-permitted facility position list. When the current position of the electric-powered vehicle 50 corresponding to the charging facility position is not included in the charge-permitted facility position list, the charging of the vehicle-mounted battery 14 is not performed.

Thus, if a thief steals the electric-powered vehicle 50 of the second preferred embodiment, he or she cannot freely perform the battery charging because the battery charging cannot be performed at other than the previously listed charging facility 40. This discourages the thief from stealing to provide a high degree of effectiveness of preventing theft.

Unlike the background art techniques, the second preferred embodiment eliminates the need to provide facilities including an authentication device, a network and the like outside the electric-powered vehicle 50 for the purpose of judging whether to charge the vehicle-mounted battery 14 or not. Also, a break in the connection between the charging device and the authentication device through a network due to a failure in the authentication device and the like does not occur in the second preferred embodiment. This achieves the charging of the vehicle-mounted battery 14 with stability.

The electric-powered vehicle 50 according to the second preferred embodiment uses the charging facility position information acquired using the GPS sensor 51 in the vehicle to judge the charge-permitted facilities. This also limits the battery charging at a charging facility provided in a home having no charging facility ID. Thus, the second preferred embodiment provides the electric-powered vehicle 50 which is capable of limiting the charging of the vehicle-mounted battery 14 in the event of theft as mentioned above to provide a high degree of effectiveness of preventing theft at costs lower than those in the first preferred embodiment.

As mentioned above, the second preferred embodiment provides the electric-powered vehicle 50 which is capable of charging the vehicle-mounted battery 14 with stability, and which is capable of limiting the charging of the vehicle-mounted battery 14 in the event of theft to provide a high degree of effectiveness of preventing theft by using a simple configuration, as in the first preferred embodiment. The second preferred embodiment also provides the electric-powered vehicle 50 having the aforementioned high degree of effectiveness at costs lower than those in the first preferred embodiment.

In the first and second preferred embodiments described above, the entry of the charge-permitted facilities into the charge-permitted facility ID list and the charge-permitted facility position list (hereinafter referred to collectively as a "charge-permitted facility list" in some cases) may be made, for example, by a dealer at the time of purchase of the electric-powered vehicles 10 and 50 or by the owner of the electric-powered vehicle 10 and 50 who manipulates the input section 19 after the purchase of the electric-powered vehicles 10 and 50.

Table 1 shows an example of the charge-permitted facility list. As shown in Table 1, for example, the charge-permitted facility list includes at least one of the charging facility ID which is the ID of each of the charge-permitted facilities and the charging facility position which is the position of each of the charge-permitted facilities. In addition, the charge-permitted facility list may include a charge-permitted period. Examples of the charge-permitted period include "only once", "this week", "this month", "from a start date to an end date" and "permanently".

TABLE 1

| Charge-Permitted Facility No. | Charging Facility ID | Charging Facility Position | Charge-Permitted Period |
| --- | --- | --- | --- |
| 1 | No | 123-1 B Town, A City | Permanently |
| 2 | O-567-JU9 | 125-5 B Town, A City | Dec. 5, 2012 to Dec. 4, 2014 |
| 3 | J-190-K15 | 345 D Town, C-City | This Week |
| 4 | G-JUB-A76 | 836-67D H Ward, E-City | Only Once |
| ... | ... | ... | ... |

The entry of the charge-permitted period into the charge-permitted facility list allows a user to enter charge-permitted facilities in accordance with the schedule of a journey. For example, when the legitimate owner of the electric-powered vehicle 10 and 50 uses the electric-powered vehicle 10 and 50 to make a journey, a charging facility at the destination of the journey may be entered as a charge-permitted facility into the charge-permitted facility list while the charge-permitted period is set so that the battery charging is permitted only during his or her visit. This further increases the degree of effectiveness of preventing theft. On the other hand, when the legitimate owner of the electric-powered vehicle 10 and 50 does not use the electric-powered vehicle 10 and 50 for a journey, the charge-permitted period may be entered into the charge-permitted facility list in corresponding relation to the charging facility which he or she uses daily so as to except the duration of the journey. This further increases the degree of effectiveness of preventing theft.

When the charging facility information acquired by the charging facility ID acquisition section 11 or the charging facility position acquisition section 52 corresponding to the charging facility information acquisition section is not included in the charge-permitted facility list, the first and second preferred embodiments described above are configured not to make a request for charging. The present invention, however, is not limited to such a configuration, but may be configured as shown in the flow diagrams of FIGS. 5 to 8 which will be described below.

Figure 5:
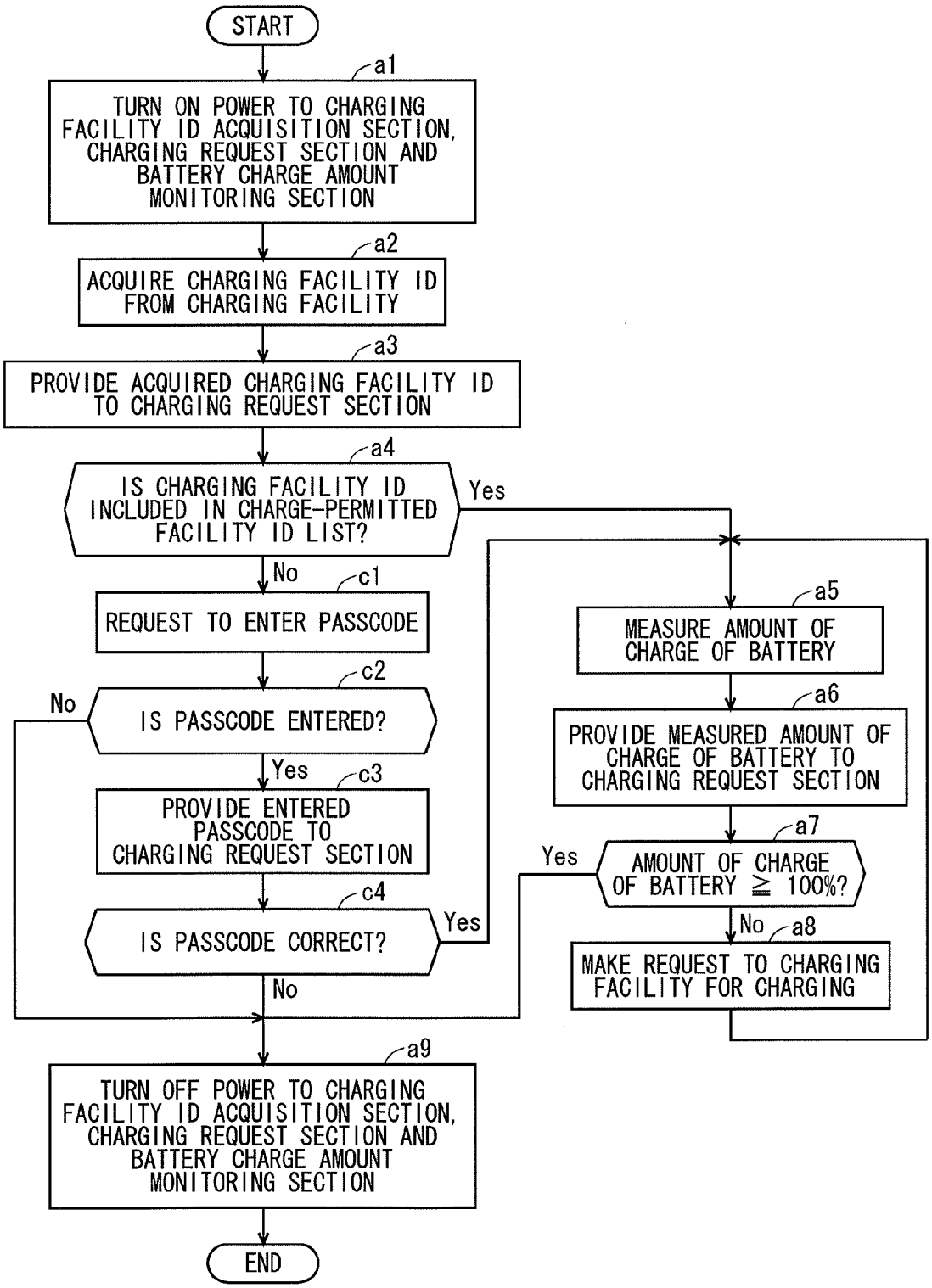

FIG. 5 is a flow diagram showing another procedure for the battery charging process of the electric-powered vehicle 10 according to the first preferred embodiment of the present invention. The process steps in the flow diagram shown in FIG. 5 are executed by the charging facility ID acquisition section 11, the charging request section 12, the vehicle control section 13 and the battery charge amount monitoring section 16 which constitute the electric-powered vehicle 10. Process steps identical with those in the flow diagram shown in FIG. 2 described above are designated in FIG. 5 by the same reference characters representing the steps, and will not be described. Upon being triggered by connecting the charging cable 30 to the electric-powered vehicle 10, the procedure in the flow diagram shown in FIG. 5 starts to proceed to Step a1.

Processes in Steps a1 to a4 are performed in a manner similar to those in Steps a1 to a4 shown in FIG. 2 described above. When it is judged in Step a4 that the charging facility ID acquired by the charging facility ID acquisition section 11 is not included in the charge-permitted facility ID list, processes in Steps c1 to c4 may be performed before the process in Step a9, as shown in the flow diagram of FIG. 5, for example.

In Step c1, the charging request section 12 requests a user to enter a passcode. For example, the charging request section 12 displays an image prompting the user to enter a passcode, thereby requesting the user to enter the passcode. The passcode is previously determined, and the legitimate owner of the electric-powered vehicle 10 is informed of the passcode at the time of the purchase of the electric-powered vehicle 10, for example. The user may enter the passcode through the input section 19. The input section 19 corresponds to a passcode input section.

In Step c2, the vehicle control section 13 judges whether a passcode is entered through the input section 19 or not. When the vehicle control section 13 judges that the passcode is entered, the procedure proceeds to Step c3. When the vehicle control section 13 judges that the passcode is not entered, the procedure proceeds to Step a9.

In Step c3, the vehicle control section 13 provides the passcode, which is entered through the input section 19, through the intra-vehicle network 23 to the charging request section 12. In Step c4, the charging request section 12 judges whether the passcode provided from the vehicle control section 13 is correct or not. When the charging request section 12 judges that the passcode is correct, the procedure proceeds to Step a5. When the charging request section 12 judges that the passcode is not correct, the procedure proceeds to Step a9. Processes in Steps a5 to a9 are performed in a manner similar to those in Steps a5 to a9 shown in FIG. 2 described above.

The aforementioned procedure allows the battery charging when the correct passcode is entered, as in the case where the charge-permitted facility information is included in the charge-permitted facility list. This allows the legitimate owner of the electric-powered vehicle 10 to perform the battery charging at any charging facility by the use of the passcode. Thus, the prevention of theft is achieved without impairment of convenience.

Similarly, the electric-powered vehicle 50 according to the second preferred embodiment may perform the processes in Steps c1 to c4 shown in FIG. 5 before the process in Step b5, when it is judged in Step b4 in the flow diagram of FIG. 4 described above that the current position which is the charging facility position acquired by the charging facility position acquisition section 52 is not included in the charge-permitted facility position list. This produces effects similar to those obtained when the processes in Steps c1 to c4 are performed in the first preferred embodiment.

Specifically, when the correct passcode is entered, the battery charging may be performed, as in the case where the charge-permitted facility information is included in the charge-permitted facility list. This allows the legitimate owner of the electric-powered vehicle 50 to perform the battery charging at any charging facility by the use of the passcode. Thus, the prevention of theft is achieved without impairment of convenience.

FIG. 6 is a flow diagram showing still another procedure for the battery charging process of the electric-powered vehicle 10 according to the first preferred embodiment of the present invention. The process steps in the flow diagram shown in FIG. 6 are executed by the charging facility ID acquisition section 11, the charging request section 12, the vehicle control section 13 and the battery charge amount monitoring section 16 which constitute the electric-powered vehicle 10. Process steps identical with those in the flow diagram shown in FIG. 2 described above are designated in FIG. 6 by the same reference characters representing the steps, and will not be described. Upon being triggered by connecting the charging cable 30 to the electric-powered vehicle 10, the procedure in the flow diagram shown in FIG. 6 starts to proceed to Step a1.

Processes in Steps a1 to a4 are performed in a manner similar to those in Steps a1 to a4 shown in FIG. 2 described above. When it is judged in Step a4 that the charging facility ID acquired by the charging facility ID acquisition section 11 is not included in the charge-permitted facility ID list, processes in Steps d1 to d4 may be performed before the process in Step a9, as shown in the flow diagram of FIG. 6, for example.

A process in Step d1 is performed in a manner similar to that in Step a5, and a process in Step d2 is performed in a manner similar to that in Step a6. In Step d3, the charging request section 12 judges whether the amount of charge of the vehicle-mounted battery 14 is less than 30% of the full charge amount or not. When the charging request section 12 judges that the amount of charge of the vehicle-mounted battery 14 is not less than 30% of the full charge amount, the procedure proceeds to Step a9. When the charging request section 12 judges that the amount of charge of the vehicle-mounted battery 14 is less than 30% of the full charge amount, the procedure proceeds to Step d4.

In Step d4, the charging request section 12 makes a request to the charging facility 40 for charging. Upon receipt of the request for charging in Step d4, the charging facility 40 outputs previously determined voltage and current to the electric-powered vehicle 10. Thus, the vehicle-mounted battery 14 is charged.

After the request for charging is made in Step d4, the procedure returns to Step d1. Then, the processes in Steps d1 to d4 are repeated. In this manner, the battery charging is performed until the amount of charge of the vehicle-mounted battery 14 reaches 30% of the full charge amount.

As described above, when it is judged in Step a4 that the charging facility ID acquired by the charging facility ID acquisition section 11 is not included in the charge-permitted facility ID list stored in the vehicle storage section 17, the charging request section 12 makes a request to the charging facility 40 for limited charging of the vehicle-mounted battery 14 so that the amount of charge of the vehicle-mounted battery 14 is smaller than that obtained when it is judged that the charging facility ID is included in the charge-permitted facility ID list.

Thus, in the example shown in FIG. 6, the vehicle-mounted battery 14 is charged up to the full charge amount, i.e. 100% of the full charge amount, when the acquired charging facility ID is included in the charge-permitted facility ID list. On the other hand, the vehicle-mounted battery 14 is charged up to 30% of the full charge amount, when the acquired charging facility ID is not included in the charge-permitted facility ID list.

This allows other than the legitimate owner of the electric-powered vehicle 10 in case of an emergency such as a disaster, for example, to charge the vehicle-mounted battery 14 of the electric-powered vehicle 10 only a small amount, thereby driving the electric-powered vehicle 10 only a short distance to a place where the electric-powered vehicle 50 does not obstruct traffic. Thus, the convenience of the user of the electric-powered vehicle 10 is improved.

Similarly, the electric-powered vehicle 50 according to the second preferred embodiment may perform the processes in Steps d1 to d4 shown in FIG. 6 before the process in Step b5, when it is judged in Step b4 in the flow diagram of FIG. 4 described above that the current position which is the charging facility position acquired by the charging facility position acquisition section 52 is not included in the charge-permitted facility position list.

This produces effects similar to those obtained when the processes in Steps d1 to d4 are performed in the first preferred embodiment. Specifically, this allows other than the legitimate owner of the electric-powered vehicle 50 in case of an emergency such as a disaster, for example, to charge the vehicle-mounted battery 14 of the electric-powered vehicle 50 only a small amount, thereby driving the electric-powered vehicle 50 only a short distance to a place where the electric-powered vehicle 50 does not obstruct traffic. Thus, the convenience of the user of the electric-powered vehicle 50 is improved.

When it is judged that the acquired charging facility information is not included in the charge-permitted facility list as described above, limited charging of the vehicle-mounted battery 14 is performed so that the amount of charge of the vehicle-mounted battery 14 is small. In such a case, a method in which other than the legitimate owners of the electric-powered vehicles 10 and 50 can charge the vehicle-mounted battery 14 to a full charge state may be left in preparation for an emergency.

Figure 7:
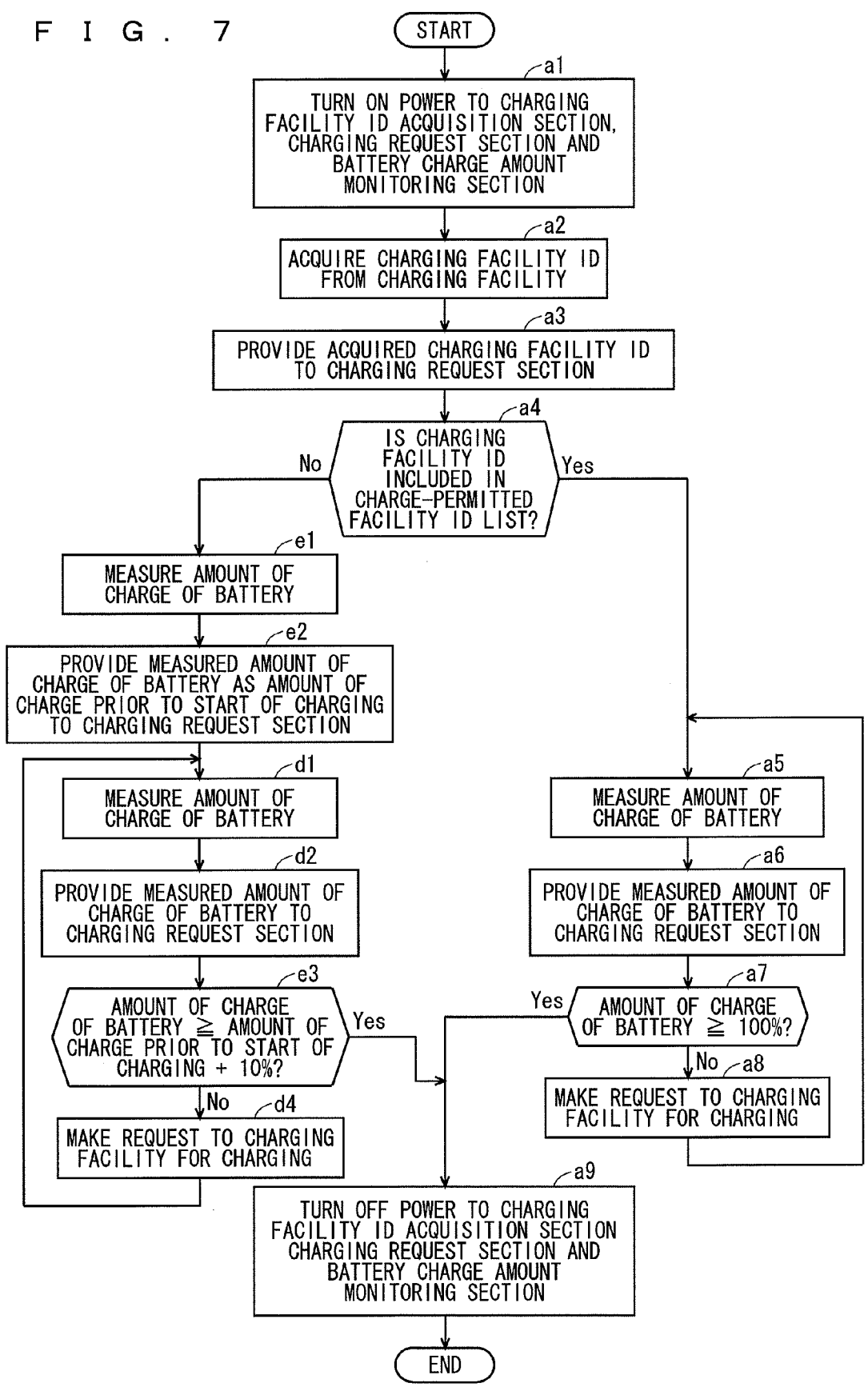

FIG. 7 is a flow diagram showing still another procedure for the battery charging process of the electric-powered vehicle 10 according to the first preferred embodiment of the present invention. The process steps in the flow diagram shown in FIG. 7 are executed by the charging facility ID acquisition section 11, the charging request section 12, the vehicle control section 13 and the battery charge amount monitoring section 16 which constitute the electric-powered vehicle 10. Process steps identical with those in the flow diagrams shown in FIGS. 2 and 6 described above are designated in FIG. 7 by the same reference characters representing the steps, and will not be described. Upon being triggered by connecting the charging cable 30 to the electric-powered vehicle 10, the procedure in the flow diagram shown in FIG. 7 starts to proceed to Step a1.

Processes in Steps a1 to a4 are performed in a manner similar to those in Steps a1 to a4 shown in FIG. 2 described above. When it is judged in Step a4 that the charging facility ID acquired by the charging facility ID acquisition section 11 is not included in the charge-permitted facility ID list, processes in Steps e1 and e2 may be performed before the process in Step d1, and a process in Step e3 may be performed between the process in Step d2 and the process in Step d4, as shown in the flow diagram of FIG. 7, for example.

In Step e1, the battery charge amount monitoring section 16 measures the amount of charge of the vehicle-mounted battery 14 in a manner similar to those in Steps a5 and d1. In Step e2, the battery charge amount monitoring section 16 provides the measured amount of charge of the vehicle-mounted battery 14 as the amount of charge prior to the start of charging through the intra-vehicle network 23 to the charging request section 12.

As in the case shown in FIG. 6, after the processes in Steps d1 and d2 are performed, the charging request section 12 judges whether the amount of charge of the vehicle-mounted battery 14 is less than the sum of the amount of charge prior to the start of charging and 10% of the full charge amount (hereinafter referred to as "the amount of charge prior to the start of charging+10%" in some cases) or not in Step e3.

When the charging request section 12 judges that the amount of charge of the vehicle-mounted battery 14 is not less than "the amount of charge prior to the start of charging+10%", the procedure proceeds to Step a9. When the charging request section 12 judges that the amount of charge of the vehicle-mounted battery 14 is less than "the amount of charge prior to the start of charging+10%", the procedure proceeds to Step d4. The process in Step d4 is performed in a manner similar to that described in the case of FIG. 6.

The aforementioned procedure adds electricity corresponding to 10% of the full charge amount for each battery charging operation. Thus, by repeating the operation of disconnecting the charging cable 30 connected to the vehicle connector 24 of the electric-powered vehicle 50 once therefrom and thereafter connecting the charging cable 30 to the vehicle connector 24 again to start the battery charging process, the vehicle-mounted battery 14 is put into a full charge state. This allows other than the legitimate owner of the electric-powered vehicle 10 in case of an emergency to charge the vehicle-mounted battery 14 of the electric-powered vehicle 10 to a full charge state. Therefore, other than the legitimate owner of the electric-powered vehicle 10 can drive the electric-powered vehicle 10 in case of an emergency.

Similarly, the electric-powered vehicle 50 according to the second preferred embodiment may perform the processes in Steps e1, e2, d1, d2, e3 and d4 shown in FIG. 7 before the process in Step b5, when it is judged in Step b4 in the flow diagram of FIG. 4 described above that the current position which is the charging facility position acquired by the charging facility position acquisition section 52 is not included in the charge-permitted facility position list. This produces effects similar to those obtained when the processes in Steps e1, e2, d1, d2, e3 and d4 are performed in the first preferred embodiment as shown in FIG. 7.

Figure 8:
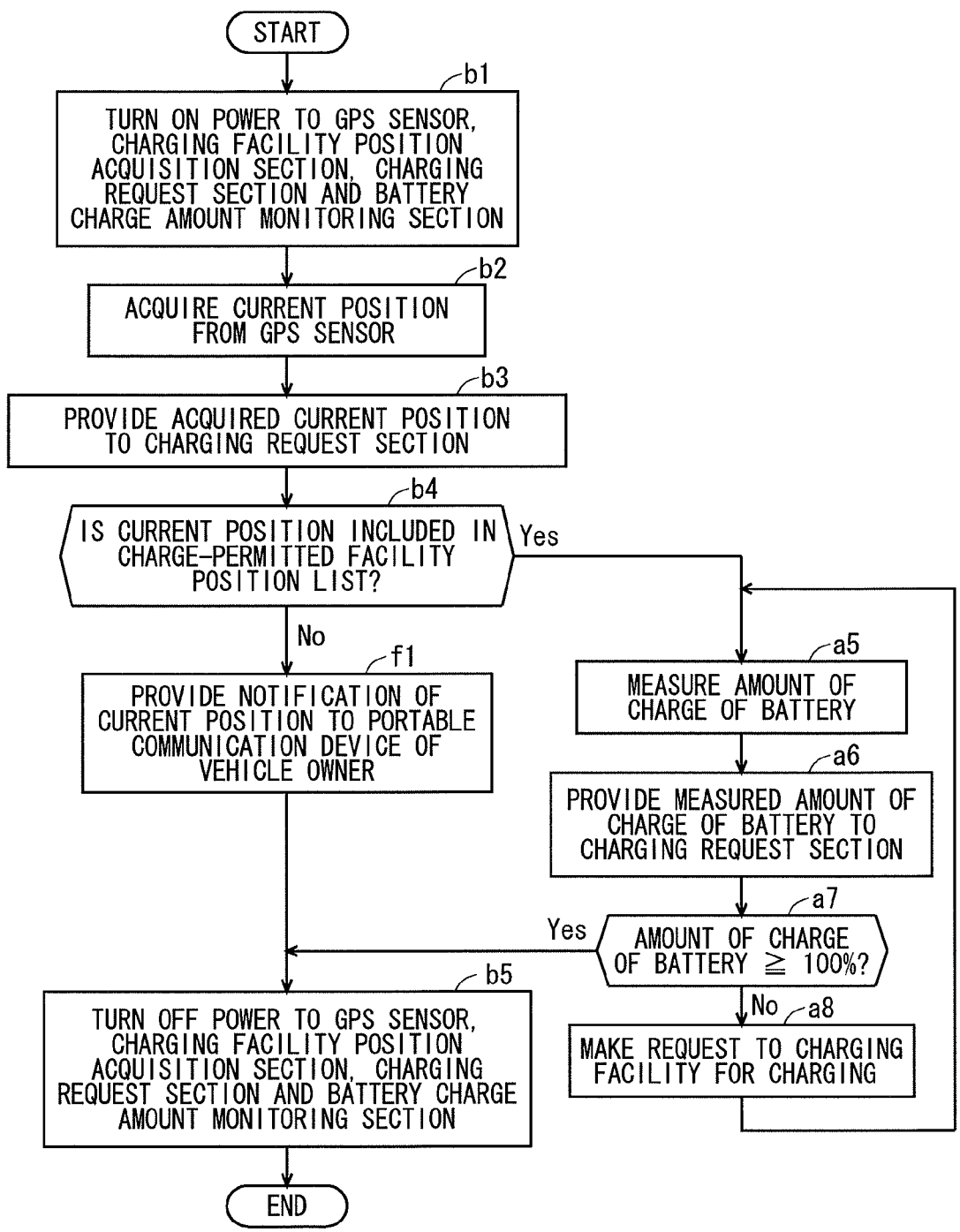
FIG. 8 is a flow diagram showing another procedure for the battery charging process of the electric-powered vehicle shown in FIG. 3 according to the second preferred embodiment of the present invention.

FIG. 8 is a flow diagram showing another procedure for the battery charging process of the electric-powered vehicle 50 according to the second preferred embodiment of the present invention. The process steps in the flow diagram shown in FIG. 8 are executed by the charging facility position acquisition section 52, the charging request section 12, the vehicle control section 13 and the battery charge amount monitoring section 16 which constitute the electric-powered vehicle 50. Process steps identical with those in the flow diagrams shown in FIGS. 2 and 4 described above are designated in FIG. 8 by the same reference characters representing the steps, and will not be described. Upon being triggered by connecting the charging cable 30 to the electric-powered vehicle 50, the procedure in the flow diagram shown in FIG. 8 starts to proceed to Step b1.

Processes in Steps b1 to b4 are performed in a manner similar to those in Steps b1 to b4 shown in FIG. 4 described above. When it is judged in Step b4 that the current position acquired by the charging facility position acquisition section 52 is not included in the charge-permitted facility position list, a process in Step f1 may be performed before the process in Step b5, as shown in the flow diagram of FIG. 8, for example.

In Step f1, the vehicle control section 13 provides notification of the current position acquired by the charging facility position acquisition section 52 in Step b2 to a portable communication device of the legitimate owner of the electric-powered vehicle 50 (hereinafter referred to as a "vehicle owner" in some cases) through the communication section 18. The portable communication device used herein may be a mobile telephone, a smartphone and a tablet-type device, for example.

Providing the notification of the current position acquired by the charging facility position acquisition section 52 to a portable communication device of the vehicle owner makes it easy for the legitimate owner of the electric-powered vehicle 50 to find the thief and the stolen electric-powered vehicle 50. This further increases the degree of effectiveness of preventing the theft of the electric-powered vehicle 50.

Similarly, the electric-powered vehicle 10 according to the first preferred embodiment may perform the process in Step f1 shown in FIG. 8 before the process in Step a9, when it is judged in Step a4 in the flow diagram of FIG. 2 described above that the charging facility ID acquired by the charging facility ID acquisition section 11 is not included in the charge-permitted facility ID list. This produces effects similar to those obtained when the process in Step f1 is performed in the second preferred embodiment as shown in FIG. 8.

As described hereinabove, the first preferred embodiment uses the charging facility ID to judge whether the charging facility 40 connected to the electric-powered vehicle 10 is a charge-permitted facility or not, and the second preferred embodiment uses the charging facility position information representing the charging facility position to judge whether the charging facility 40 connected to the electric-powered vehicle 50 is a charge-permitted facility or not. The first and second preferred embodiments may be integrated together so as to use both the charging facility ID and the charging facility position information, thereby judging whether the connected charging facility 40 is a charge-permitted facility or not.

The preferred embodiments according to the present invention may be freely combined within the scope of the invention. Any component in the preferred embodiments may be changed and dispensed with, as appropriate.

While the invention has been described in detail, the foregoing description is in all aspects illustrative and not restrictive. It is understood that numerous other modifications and variations can be devised without departing from the scope of the invention.

What is claimed is:

1. An electric-powered vehicle traveling using electric power stored in a battery as a power source, comprising:
    a battery rechargeable by charging facilities provided outside said electric-powered vehicle;
    a charging request section that makes a request to said charging facilities for charging of said battery;
    a storage section that stores therein charge-permitted facility information about some of said charging facilities which are permitted to charge said battery; and
    a charging facility information acquisition section that acquires charging facility information about said charging facilities from said one charging facility when connected to said one charging facility,
    said charging request section making the request to said one charging facility for charging of said battery, when said charging request section judges that said charging facility information acquired by said charging facility information acquisition section is included in said charge-permitted facility information stored in said storage section.

2. The electric-powered vehicle according to claim 1, wherein said charge-permitted facility information includes at least charging facility identification information for identifying said charging facilities;

wherein said charging facility information acquisition section acquires at least said charging facility identification information as said charging facility information; and wherein said charging request section makes the request to said one charging facility for charging of said battery, when said charging request section judges that at least said charging facility identification information acquired by said charging facility information acquisition section is included in said charge-permitted facility information stored in said storage section.

3. The electric-powered vehicle according to claim 1, wherein said charge-permitted facility information includes at least charging facility position information representing the position where said charging facilities are installed;

wherein said charging facility information acquisition section acquires at least said charging facility position information as said charging facility information; and wherein said charging request section makes the request to said one charging facility for charging of said battery, when said charging request section judges that at least said charging facility position information acquired by said charging facility information acquisition section is included in said charge-permitted facility information stored in said storage section.

4. The electric-powered vehicle according to claim 1, further comprising a passcode input section that receives an entry of a previously determined passcode, wherein said charging request section makes the request to said one charging facility for charging of said battery, when said charging request section judges that said charging facility information acquired by said charging facility information acquisition section is not included in said charge-permitted facility information stored in said storage section and that said passcode is entered through said passcode input section.

5. The electric-powered vehicle according to claim 1, wherein, when said charging request section judges that said charging facility information acquired by said charging facility information acquisition section is not included in said charge-permitted facility information stored in said storage section, said charging request section makes the request to said one charging facility for limited charging of said battery so that an amount of charge of said battery is smaller than that obtained when it is judged that said charging facility information is included in said charge-permitted facility information.

* * * * *